United States Patent
Tseng

(10) Patent No.: US 8,947,212 B2
(45) Date of Patent: Feb. 3, 2015

(54) ACTIVE ELECTRONIC TAG AND SIGNAL MODULATION METHOD THEREOF

(75) Inventor: Han-Yang Tseng, New Taipei (TW)

(73) Assignees: Mosart Semiconductor Corp, Taiwan (CN); Being Tech Electronics Corp., Taiwan (CN)

( * ) Notice: Subject to any disclaimer, the term of this patent is extended or adjusted under 35 U.S.C. 154(b) by 454 days.

(21) Appl. No.: 13/539,238

(22) Filed: Jun. 29, 2012

(65) Prior Publication Data

US 2013/0257599 A1  Oct. 3, 2013

(30) Foreign Application Priority Data

Mar. 31, 2012  (CN) .......................... 2012 1 0098724

(51) Int. Cl.
*H04Q 5/22*  (2006.01)

(52) U.S. Cl.
USPC ........................................ 340/10.5; 340/10.4

(58) Field of Classification Search
USPC ................ 340/10.1–10.52, 572.1–572.9
See application file for complete search history.

(56) References Cited

U.S. PATENT DOCUMENTS

| | | | |
|---|---|---|---|
| 4,739,328 A * | 4/1988 | Koelle et al. ..................... | 342/44 |
| 4,947,407 A * | 8/1990 | Silvian .......................... | 375/340 |
| 6,249,212 B1 * | 6/2001 | Beigel et al. ................ | 340/10.34 |
| 2004/0001600 A1 * | 1/2004 | Kim et al. ...................... | 381/100 |
| 2006/0111051 A1 * | 5/2006 | Barink et al. ................... | 455/70 |
| 2006/0284727 A1 * | 12/2006 | Steinke ........................ | 340/10.31 |
| 2007/0001814 A1 * | 1/2007 | Steinke et al. ............ | 340/10.31 |
| 2007/0120674 A1 * | 5/2007 | Takeuchi .................... | 340/572.2 |
| 2007/0194886 A1 * | 8/2007 | Bang et al. .................. | 340/10.1 |
| 2007/0205871 A1 * | 9/2007 | Posamentier ................ | 340/10.3 |
| 2007/0297534 A1 * | 12/2007 | Okunev ......................... | 375/316 |
| 2008/0018433 A1 * | 1/2008 | Pitt-Pladdy ................... | 340/10.4 |
| 2008/0074282 A1 * | 3/2008 | Koo et al. ................... | 340/825.7 |
| 2008/0150699 A1 * | 6/2008 | Ohara et al. ................. | 340/10.4 |
| 2010/0109903 A1 * | 5/2010 | Carrick ..................... | 340/825.49 |
| 2012/0044017 A1 * | 2/2012 | Lachartre ...................... | 329/336 |
| 2012/0105211 A1 * | 5/2012 | Rezayee et al. ............. | 340/10.2 |
| 2012/0223854 A1 * | 9/2012 | Nogami et al. ............... | 342/127 |
| 2013/0107913 A1 * | 5/2013 | Savoj ............................ | 375/219 |

* cited by examiner

*Primary Examiner* — Hai Phan
*Assistant Examiner* — Orlando Bousono
(74) *Attorney, Agent, or Firm* — Mintz Levin Cohn Ferris Glovsky and Popeo, P.C.

(57) ABSTRACT

An active electronic tag and a signal modulation method are provided herein. The active electronic tag includes an antenna, a first amplifier, an automatic gain control circuit, a phase synchronization locking circuit, a control unit, a tag unit and a second amplifier. The antenna receives a detecting signal transmitted from a reader, in which the detecting signal is carried on a first carrier. The phase synchronization locking circuit generates a second carrier. The control unit generates a response signal, in which the response signal is carried on the second carrier. By utilizing a phase difference of the first carrier and the second carrier, the response signal cancels the first carrier on the reader so as to transmit the information stored in the active electronic tag.

12 Claims, 4 Drawing Sheets

ACTIVE ELECTRONIC TAG AND SIGNAL MODULATION METHOD THEREOF

RELATED APPLICATIONS

This application claims priority to Chinese Application Serial Number 201210098724.5, filed Mar. 31, 2012, which is herein incorporated by reference.

BACKGROUND

1. Field of Invention

The present invention relates to an electronic tag and a signal modulation method thereof. More particularly, the present invention relates to an active electronic tag and a signal modulation method thereof.

2. Description of Related Art

With the advance of radio frequency technology, an electronic tag with a radio circuit has been used widely in, for example, identity identification, door entrance security system or electronic money.

Conventionally, an electronic tag works passively, which is driven by a detecting signal and a carrier transmitted from a reader, and the electronic tag utilizes the coupling effect of antennas to affect the amplitude of the carrier on the reader by varying its load resistance.

However, while most of electronic products are becoming increasingly thinner, lighter and miniaturized, electronic tags are still limited by the sizes of their antennas and cannot be miniaturized. The reason is that the information transmission distance is limited by the antenna dimension of the electronic tag. When the antenna dimension of the electronic tag is decreased, the coupling coefficient between the antenna of the passive electronic tag and the antenna of the reader is also decreased, and thus the change of the load resistance on the passive electronic tag is unable to or only minimally affect the voltage on the reader. As a result, the information stored in the passive electronic tag cannot be transmitted to the reader effectively.

Therefore, in order to simultaneously shrink the electronic tag and maintain the information transmission efficiency of the electronic tag for facilitating various applications of the electronic tag, there is an urgent need to solve the problem mentioned above.

SUMMARY

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

An aspect of the present invention is to provide an active electronic tag for effectively transmitting information when its antenna is shrunk.

According to an embodiment, the active electronic tag includes an antenna, a first amplifier, an automatic gain control circuit, a phase synchronization locking circuit, a control unit, a tag unit, and a second amplifier. The antenna is configured to receive a detecting signal from a reader, in which the detecting signal is carried by a first carrier. The first amplifier is connected to the antenna, for amplifying the detecting signal. The automatic gain control circuit is connected to the first amplifier, for stabilizing the detecting signal amplified by the first amplifier in a feedback loop. The phase synchronization locking circuit is connected to the first amplifier, for receiving the amplified detecting signal and a TX enable signal, and generating a second carrier and a phase-locked clock. The control unit is connected to the first amplifier and the phase synchronization locking circuit, for receiving the amplified detecting signal, the second carrier, and the phase-locked clock, and detecting the load resistance change of the tag unit, in which when the change of the load resistance is detected, the control unit generates the TX enable signal and a response signal, and the response signal is carried by the second carrier. The tag unit is connected to the control unit, for storing tag information, in which the control unit transmits the detecting signal to the tag unit and selects either the first carrier or the phase-locked clock as the driving clock for the tag unit, and the tag unit varies its load resistance according to the tag information, and the control unit switches the driving clock for the tag unit according to the change of the load resistance. The second amplifier is connected to the control unit and the antenna, for amplifying and outputting the response signal to the antenna, in which the antenna transmits the amplified response signal to the reader. The response signal utilizes a phase difference between the first carrier and the second carrier to cancel or reduce the amplitude of the first carrier on the reader, so as to transmit the tag information.

According to an embodiment, the phase difference between the first carrier and the second carrier is from 158.34 to 201.66 degrees.

According to an embodiment, the phase synchronization locking circuit comprises an oscillator, a frequency divider, a delay circuit, a phase selecting unit, and an offset adjusting unit. The oscillator is configured to generate an oscillator frequency. The frequency divider is configured to divide the oscillator frequency to generate an internal clock. The delay circuit is configured to delay the internal clock to generate a plurality of delayed clocks, in which phases of all of the delayed clocks are different, and frequencies of all of the delayed clocks are the same as that of the internal clock. The phase selecting unit has a phase locked count for selecting and outputting one of the delayed clocks as the phase-locked clock, in which the phase-locked clock has a phase which is the most or second most close the phase of the first carrier. The offset adjusting unit is configured to select the second carrier from the delayed clocks based on both of the phase locked count and an offset adjusting parameter, in which the offset adjusting parameter is utilized to adjust the phase of the second carrier, such that the response signal carried by the second carrier cancels the amplitude of the first carrier on the reader.

According to an embodiment, the phase selecting unit comprises an up/down counter, a first phase selector, and a phase comparator. The up/down counter is configured to adjust the phase locked count according to an up count signal or a down count signal, in which the up/down counter stops adjusting the phase locked count when receiving the TX enable signal. The first phase selector is configured to select one of the delayed clocks as the phase-locked clock based on the phase locked count generated from the up/down counter. The phase comparator is configured to compare the first carrier with the phase-locked clock, and accordingly generate the up count signal or the down count signal based on the result of the comparison.

According to an embodiment, the offset adjusting unit comprises an adder with a second phase selector. The adder comprises an input port for inputting the offset adjusting parameter, thereby adding up the phase locked count and the offset adjusting parameter to generate a second carrier count. The second phase selector is configured to select one of the delayed clocks as the second carrier based on the second carrier count.

According to an embodiment, the control unit comprises a detector, a switching unit, and an AND gate. The detector is configured to detect the load resistance changes of the tag unit, and generate the TX enable signal according to the change of the load resistance. When receiving the TX enable signal, the switching unit selects the phase-locked clock as the driving clock to drive the tag unit, and when the TX enable signal is stopped, the switching unit switches the driving clock back to the first carrier. The AND gate is configured to receive the second carrier and the TX enable signal, and generate the response signal to the second amplifier.

Another aspect of the present invention is to provide a signal modulation method of the active electronic tag. According to an embodiment, the active electronic tag comprises a tag unit for storing tag information, and the signal modulation method comprises a step of receiving a detecting signal transmitted from a reader, wherein the detecting signal is carried by a first carrier; a step of amplifying and stabilizing the detecting signal in a feedback loop; a step of transmitting the detecting signal to the tag unit and selecting either the first carrier or the phase-locked clock as a driving clock to drive the tag unit, in which the tag unit varies a load resistance according to the tag information; a step of generating a second carrier and the phase-locked clock according to an oscillator frequency and a TX enable signal; a step of detecting a change of a load resistance, in which when the change of the load resistance is detected, the control unit generates the TX enable signal and a response signal, and the response signal is carried by the second carrier; a step of amplifying the response signal; and a step of transmitting the response signal to the reader, in which the response signal utilizes a phase difference between the first carrier and the second carrier to cancel the amplitude of the first carrier on the reader, so as to transmit the tag information.

According to an embodiment, the phase difference between the first carrier and the second carrier is from 158.34 to 201.66 degrees.

According to an embodiment, the step of generating the second carrier and the phase-locked clock comprises a step of generating an oscillator frequency; a step of dividing the oscillator frequency to generate an internal clock; a step of delaying the internal clock to generate a plurality of delayed clocks, in which phases of all of the delayed clocks are different, and frequencies of all of the delayed clocks are the same as the internal clock, the step of selecting and outputting one of the delayed clocks as the phase-locked clock, in which the phase-locked clock has a phase which is the most or second most close to the phase of the first carrier, and the step of selecting one of the delayed clocks as the second carrier based on both of the phase locked count and an offset adjusting parameter, in which the offset adjusting parameter is utilized to adjust the phase of the second carrier, such that the response signal carried by the second carrier cancels the amplitude of the first carrier on the reader.

According to an embodiment, the step of selecting the phase-locked clock from the delayed clocks comprises the step of adjusting the phase locked count according to an up count signal or a down count signal, and stopping adjusting the phase locked count when the TX enable signal is received, the step of selecting one of the delayed clocks as the phase-locked clock based on the phase locked count, and the step of phase comparing the first carrier and the phase-locked clock, and accordingly generating the up count signal or the down count signal based on the result of the comparison.

According to an embodiment, the step of selecting the second carrier from the delayed clocks comprises a step of adding up the phase locked count and the offset adjusting parameter to generate a second carrier count, and the step of selecting one of the delayed clocks as the second carrier based on the second carrier count.

According to an embodiment, the step of generating a TX enable signal and a response signal comprises a step of detecting the change of the load resistance, and generating the TX enable signal according to the change of the load resistance; a step of selecting the phase-locked clock as the driving clock to drive the tag unit when the TX enable signal is received, and switching the driving clock to the first carrier when the TX enable signal is stopped; and a step of inputting the second carrier and the TX enable signal to an AND gate to generate the response signal.

In summary, by utilizing the embodiments of the present invention, the active electronic tag transmits the tag information to the reader by transmitting the response signal to cancel the amplitude of the first carrier on the reader. Therefore, when the antenna of the active electronic tag is miniaturized, the second amplifier can amplify the response signal such that the tag information can be transmitted efficiently. Furthermore, the phase synchronization locking circuit can generate the phase-locked clock in phase with the first carrier, and generate the second carrier in opposite phase with the first carrier in a short time, in which the phase-locked clock can be used to serve as the driving clock of the tag unit during transmitting so as to stabilize the system, and the second carrier can carry the response signal to cancel the first carrier. By implementing the aforementioned embodiments, the electronic tag can be miniaturized, and the transmission distance of the electronic tag can be lengthened. As a result, the application scope of the electronic tag can be broadened.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
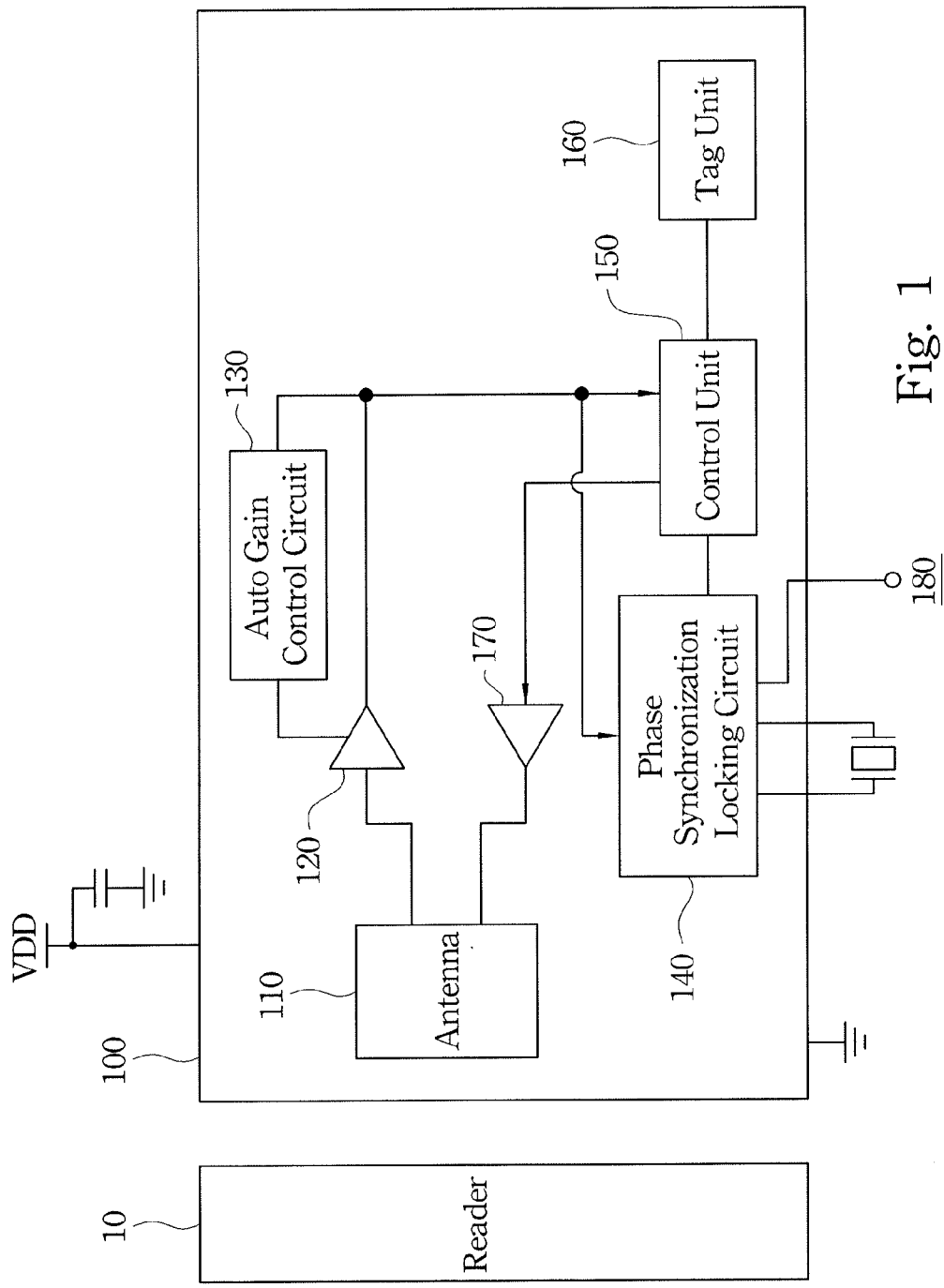
FIG. 1 is a functional block diagram showing an active electronic tag according to a first embodiment of the disclosure.

In the following detailed description, for purposes of explanation, numerous specific details are set forth in order to attain a thorough understanding of the disclosed embodiments. It will be apparent, however, that one or more embodiments may be practiced without these specific details. In other instances, well-known structures and devices are schematically shown in order to simplify the drawing.

An active electronic tag provided herein can solve the problem that tag information of a conventional passive electronic tag can hardly be transmitted when an antenna thereof is miniaturized. The active electronic tag transmits the tag information by transmitting a response signal to a reader to cancel an amplitude of a first carrier on the reader, so that the response signal can be amplified when the antenna of the active electronic tag is miniaturized. In addition, for canceling the amplitude of the first carrier on the reader by the response signal, the active electronic tag utilizes an oscillator, a frequency divider, and a delay circuit to generate a second carrier in opposite phase with the first carrier so as to carry the response signal, and generate a phase locked clock to ensure the stability of the active electronic tag when the response signal is transmitted.

FIG. 1 is a functional block diagram showing an active electronic tag according to a first embodiment of the disclosure. An active electronic tag 100 includes an antenna 110, a first amplifier 120, an automatic gain control circuit 130, a phase synchronization locking circuit 140, a control unit 150, a tag unit 160, and a second amplifier 170. An external voltage source VDD is connected to the active electronic tag 100, and the voltage of the external voltage source can be 2.7-3.3V.

As to the structure, the first amplifier 120 is connected to the antenna 110. The automatic gain control circuit 130 is connected to the first amplifier 120. The phase synchronization locking circuit 140 is connected to the first amplifier 120 and the automatic gain control circuit 130. The control unit 150 is connected to the first amplifier 120, the automatic gain control circuit 130 and the phase synchronization locking circuit 140. The tag unit 160 is connected to the control unit 150. The second amplifier 170 is connected to the control unit 150 and the antenna 110. The antenna 110 can be a planar loop antenna. The first amplifier 120 can be a low noise amplifier. The second amplifier 170 can be a power amplifier. The automatic gain control circuit 130, the phase synchronization locking circuit 140, the control unit 150 and the tag unit 160 can be realized in a hardware circuit design or software design, in which the tag unit 160 can also be a conventional passive electronic tag.

As to the operation, when the active electronic tag 100 is approaching to a reader 10, the antenna 110 receives a detecting signal transmitted by the reader 10, and the detecting signal is carried by a first carrier. However, with the influence of the transmission distance and the transmission channel, the detecting signal received by the antenna 110 may be weak or unstable, and thus the first amplifier 120 is configured to amplify the detecting signal, and the automatic gain control circuit 130 is configured to stabilize the amplified detecting signal in a feedback loop. The phase synchronization locking circuit 140 is configured to receive the amplified detecting signal and a TX enable signal, and generate a second carrier and a phase-locked clock, in which the second carrier is in opposite phase with the first carrier, and the phase-locked clock is in phase with the first carrier. The control unit 150 is configured to receive the amplified detecting signal, the second carrier, and the phase-locked clock, thereby transmitting the detecting signal to the tag unit 160, to select either the first carrier or the phase-locked clock as a driving clock for the tag unit 160, and to detect a load resistance changes of the tag unit 160. The tag unit 160 is configured to store tag information, and the load resistance of the tag unit 160 can be varied according to the tag information. When the control unit 150 detects the change of the tag unit 160, the control unit 150 generates the TX enable signal and the response signal, and selects the phase-locked clock as the driving clock for the tag unit 160, in which the response signal is carried by the second carrier. The second amplifier 170 is configured to amplify and output the response signal to the antenna 110. Thereafter, the antenna 110 transmits the amplified response signal to the reader 10, in which the response signal utilizes the phase difference between the second carrier and the first carrier to cancel the amplitude of the first carrier on the reader 10, so as to transmit the tag information.

In this embodiment, the amplifiers 120 and 170 can be used to increase the transmission distance by amplifying the detecting signal and the response signal, such that the tag information can be transmitted efficiently. In addition, the second carrier and the phase-locked clock are generated by an internal oscillator within the phase synchronization locking circuit 140, such that the second carrier and the phase-locked clock will not be interfered by other signals or the transmission channel. The frequencies of the second carrier and phase-locked clock are the same as the frequency of the first carrier. The second carrier is in opposite phase with the first carrier, so that the response signal carried by the second carrier can cancel the amplitude of the first carrier. The phase-locked clock is in phase with the first carrier to replace the first carrier and serve as the driving signal for the tag unit 160 when the active electronic tag 100 is transmitting the response signal, so as to prevent the system instability caused by the first carrier interfered by the response signal. It is noted that, in this embodiment, the frequency of the first and second carrier can be 13.56 MHz, but can also be 125 kHz or another frequency, and the aforementioned embodiment is not limited thereto. In addition, the detecting signal and the response signal can be modulated by on off keying, such as the modified Miller coding, and then be carried by the first or second carrier to be transmitted. It is also noted that the coding method does not limited the aforementioned embodiment. Furthermore, in this embodiment, the tag unit 160 can be regarded as a conventional passive electronic tag, in which the load resistance thereof varied after being driven, so as to transmit the tag information. However, the tag unit 160 can be realized by a hardware circuit design or a software design in practice, and is not limited to a substantial passive electronic tag.

Figure 2:
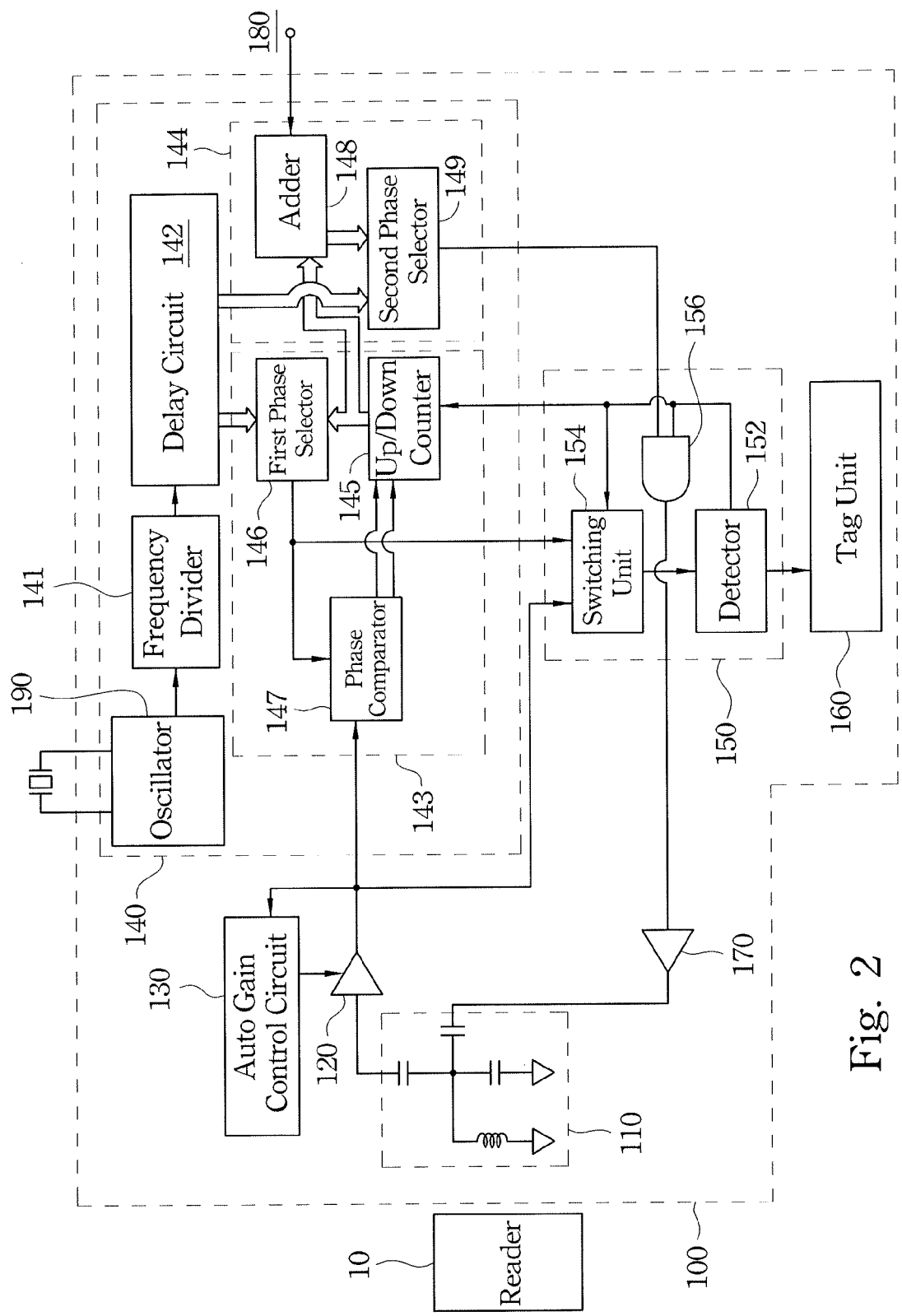
FIG. 2 is a functional block diagram showing an active electronic tag shown in FIG. 1.

FIG. 2 is a functional block diagram showing an active electronic tag shown in FIG. 1. The phase synchronization locking circuit 140 includes an oscillator 190, a frequency divider 141, a delay circuit 142, a phase selector 143, and an offset adjusting unit 144.

In the case of the structure, the divider 141 is connected to the oscillator 190. The delay circuit 142 is connected to the frequency divider 141. The phase selector 143 is connected to the first amplifier 120, the automatic gain control circuit 130, and the delay circuit 142. The offset adjusting unit 144 is connected to the delay circuit 142 and the phase selector 143.

As to the functionality, because the active electronic tag 100 may be used in near field communication, the phase synchronization locking circuit 140 should generate the phase-locked clock in phase with the first carrier and the second carrier phase in opposite phase with the first carrier phase in time, so as to ensure the active electronic tag 100 to respond rapidly. The oscillator 190 is configured to generate an oscillator frequency. The frequency divider 141 is configured to divide the oscillator frequency to generate an internal clock. In this embodiment, the oscillator 190 can be a crystal oscillator, and the oscillator frequency is determined by an external crystal. The crystal frequency is varied inversely with the size of the crystal, so that a smaller crystal with higher frequency, such as 54.24 MHz, may be chosen, and then the oscillator frequency can be divided by 4 within the frequency divider 141 to generate the system frequency, such as 13.56 MHz. The delay circuit 142 is configured to delay the internal clock to generate a plurality of delayed clocks, in which the phases of all delayed clocks are different, and the frequencies of all delayed clocks are the same as that of the internal clock. The phase selecting unit 143 has a phase locked count, for selecting and outputting one of the delayed clocks as the phase-locked clock, in which the phase-locked clock has a phase which is the most or second most close to the phase of the first carrier. The offset adjusting unit 144 is configured to select the second carrier from the delayed clocks based on both of the phase locked count and an offset adjusting parameter, in which the offset adjusting parameter is utilized to adjust the phase of the second carrier, such that the response signal carried by the second carrier cancels the amplitude of the first carrier on the reader 10. When the delay circuit 142 generates more delayed clocks, the phase of the second carrier and the phase-locked clock would be more accurate. In this embodiment, the quantity of the delayed clocks can be sixteen. It is noted that the type of the oscillator 190, the oscillator frequency generated by the oscillator 190, the devisor in the frequency divider, and the quantity of the delayed clocks abovementioned are merely examples for explanation, and do not limited the aforementioned embodiment.

In the embodiment above, by utilizing the delay circuit 142, the active electronic tag 100 can generate a plurality of delayed clocks having the same frequencies and different phases in one period time of the system clock. After delayed clocks are generated, by utilizing the phase selecting unit 143 and the offset adjusting unit 144, the phase-locked clock and the second carrier can be rapidly generated, and the active electronic tag 100 can therefore respond to the detecting signal of the reader 10 in real time.

In this embodiment, the phase selecting unit 143 is configured to select and output one of the delayed clocks as the phase-locked clock, and the phase-locked clock has a phase equal to the phase of the first carrier.

In view of the structure, the phase selecting unit 143 includes an up/down counter 145, a first phase selector 146, and a phase comparator 147. The first phase selector 146 is connected to the delay circuit 142, the up/down counter 145, and the control unit 150. The phase comparator 147 is connected to the first amplifier 120, automatic gain control circuit 130, the first phase selector 146, and the up/down counter 145.

As to the functionality, the phase selecting unit 143 is configured to select and output one of the delayed clocks as the phase-locked clock. The up/down counter 145 has a phase locked count, and is configured to adjust the phase locked count according to an up count signal or a down count signal. When receiving the TX enable signal, the up/down counter 145 stops adjusting the phase locked count. The first phase selector 146 is configured to select one of the delayed clocks as the phase-locked clock based on the phase locked count. The phase comparator is configured to compare the first carrier with the phase-locked clock and accordingly generates the up count signal or the down count signal based on the result of the comparison.

With the operations above, thereafter, the phase-locked clock is altered between two of the delayed clocks of which phases are the most or second most close to the phase of the first carrier. Hence, when the active electronic tag 100 starts transmitting the response signal, and when the up/down counter 145 receives the TX enable signal generated by the control unit 150 and stops adjusting the phase locked count, the phase-locked clock therefore become one of the delayed clocks which has a phase which is the most or second most close to the phase of the first carrier.

In this embodiment, the offset adjusting unit 144 is configured to select the second carrier from the delayed clocks, in which the second carrier is in opposite phase with the first carrier, such that the response signal carried by the second carrier can cancel the amplitude of the first carrier on the reader 10. However, a phase offset occurs when a signal is transmitted in air or electronic components, so that by inputting an offset adjusting parameter, the offset adjusting unit 144 can compensate the phase offset.

As to the structure, the offset adjusting unit 144 comprises an adder 148 and a second phase selector 149. The adder 148 includes an input port 180 and is connected to the up/down counter 145. The second phase selector 149 is connected to the delay circuit 142 and the adder 148.

As to the functionality, the adder 148 is configured to receive an offset adjusting parameter, add up the phase locked count of the up/down counter 145 and the offset adjusting parameter, and generate a second carrier count. The second phase selector 149 is configured to select one of the delayed clocks as the second carrier based on the second carrier count.

In this embodiment, as a result of the characteristic of the hardware design, a deviation between the phase-locked clock and the first carrier may be found. Furthermore, because of the frequency uncertainty between the reader 10 and the active electronic tag 100, the second carrier can hardly be in opposite phase with the first carrier completely. For an example of a 13.56 MHz passive near field communication electronic tag, the maximum allowable error of the frequency is ±7 kHz, and the length of the response signal could be 56 periods of the driving clock of the electronic tag. When the quantity of the delayed clocks is sixteen, the maximum phase error is:

$$\pm\{(360°/16)\times(\tfrac{1}{2})+(13.567M/13.56M-1)\times360°\times\}=\pm21.66°$$

In other words, the phase difference between the second carrier and the first carrier is between 180°±21.66°, that is, the phase difference is from 158.34° to 201.66°. If, when the phase difference is 180°, the cancellation of the amplitude of the first carrier caused by the second carrier is 1 or 0 dB, then when the phase difference is 180°±21.66°, the cancellation of the amplitude of the first carrier caused by the second carrier is reduced to 0.929, that is, the attenuation is 0.637 dB. Within the range of the deviation above, the information transmission can still work.

In this embodiment, the control unit 150 is configured to control the transmitting or receiving state of the active electronic tag 100, and generate the response signal.

As to the structure, the control unit 150 comprises a detector 152, a switching unit 154, and an AND gate 156. The detector 150 is connected to the tag unit 160, and the up/down counter 145. The switching unit 154 is connected to the first amplifier 120, the automatic gain control circuit 130, the first phase selector 146, and the detector 152. The AND gate 156 is connected to the second phase selector 149, and the detector 152.

As to the functionality, the detector 152 is configured to detect the change of the load resistance of the tag unit 160, and generate the TX enable signal according to the change of the load resistance. When receiving the TX enable signal, the phase synchronization locking circuit 140 stops adjusting the phase locked count such that the phase-locked clock and the second carrier is determined, and the switching unit 154 selects the determined phase-locked clock as the driving clock to drive the tag unit 160. When receiving the second carrier and the TX enable signal, the AND gate 156 generates the response signal to the second amplifier 170. When the TX enable signal is stopped, the phase-locked clock continues to be altered, and the driving clock is switched back to the first carrier.

With the operations of the control unit 150 mentioned above, when the change of the load resistance of the tag unit 150 is detected, and when the active electronic tag 100 starts to transmit the response signal, the phase-locked clock has stopped altering, so that the phase-locked clock can replace the first carrier to serve as the driving clock of the tag unit 160. It is noted that, the control unit 150 can be realized by electronic components, a software design and/or a microprocessor, and the present invention is not limited to these regards.

In this embodiment, after being amplified by the second amplifier 170, the response signal is transmitted to the reader 10 by the antenna 110. The first carrier is cancelled by the response signal, such that the tag information of the active electronic tag 100 is transmitted to the reader 10.

Figure 3:
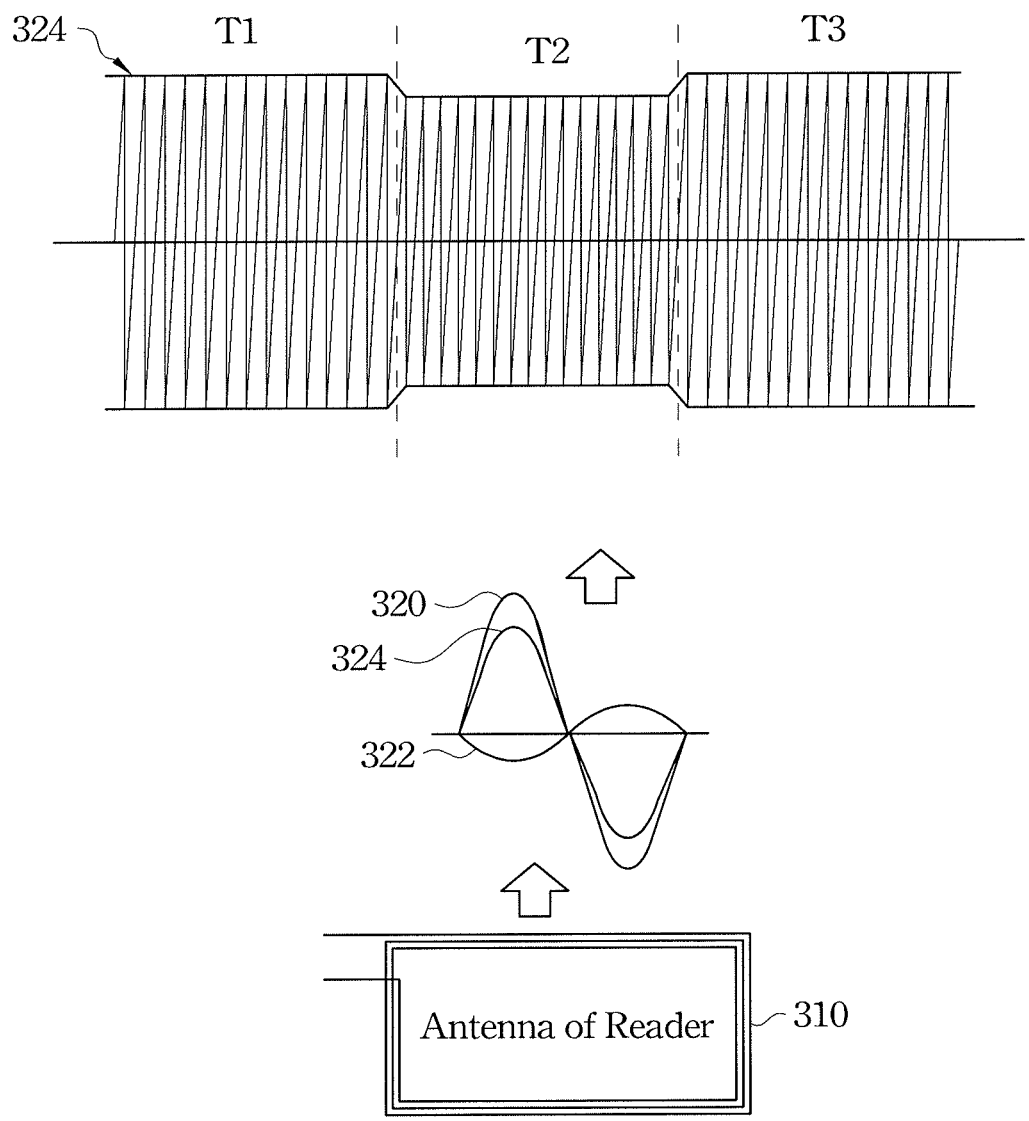
FIG. 3 is a graph illustrating a response signal canceling an amplitude of a first carrier in the first embodiment of the disclosure.

FIG. 3 is a graph illustrating the response signal canceling the amplitude of the first carrier in the first embodiment of the disclosure. The first carrier on the antenna of the reader 310 is shown as a wave 320. The response signal transmitted by the active electronic tag 100 is shown as a wave 322. When the antenna of the reader 310 receives the response signal, the response signal is couples with the first carrier. Because the phase of the first carrier and the response signal are inverse, the response signal (wave 322) cancels a portion of the first carrier (wave 320), and a reader signal is thereby generated shown as a wave 324. In the T1 period, the antenna of the reader 310 does not receive the response signal or the response signal is at a low voltage level, so that the reader signal is equal to the first carrier. In the T2 period, the antenna of the reader 310 receives the response signal, and the response signal is at a high voltage level, so that the reader signal is equal to the first carrier substrate the response signal. In the T3 period, the response signal is finished or is at a low voltage level, so that the reader signal is equal to the first carrier.

Another aspect of the present invention is to provide a signal modulation method of the active electronic tag. According to the second embodiment of the present invention, the active electronic tag has a tag unit for storing tag information, and the load resistance of the tag unit is variable.

Figure 4:
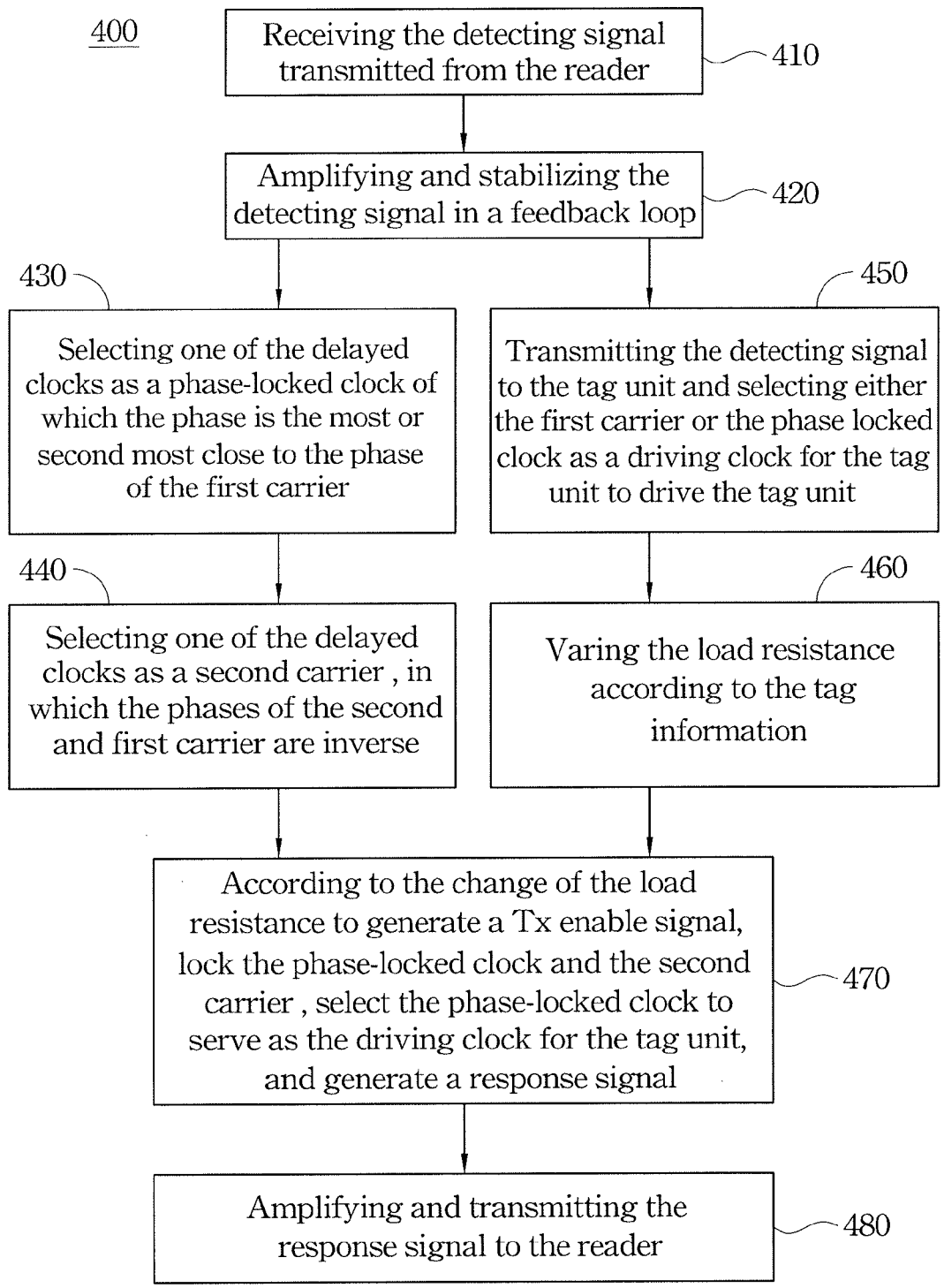
FIG. 4 is a flow chart showing a signal modulation method according to a second embodiment of the disclosure.

As shown in FIG. 4, the signal modulation method 400 includes steps 410 to 480.

In step 410, the active electronic tag receives a detecting signal transmitted from a reader when it is near the reader, and the detecting signal is carried by a first carrier.

In step 420, because the detecting signal may be weak or unstable, an amplifier and a feedback loop are utilized to amplify and stabilize the detecting signal after the detecting signal is received. Subsequently, the amplified detecting signal is transmitted to the inner part of the active electronic tag.

In step 430, a plurality of delayed clocks are generated, and by comparing, one of the delayed clocks is selected as a phase-locked clock of which the phase is the most or second most close to the phase of the first carrier. The phase-locked clock is provided to the tag unit when the active electronic tag transmits a response signal to the reader.

In step 440, one of the delayed clocks is selected as a second carrier, in which the phases of the second and first carrier are inverse. The second carrier is utilized to carry the response signal for canceling the first carrier on the reader.

In step 450, the amplified detecting signal is transmitted to the tag unit 160, and the first carrier carrying the detecting signal is selected to serve as a driving signal to drive the tag unit.

In step 460, the tag unit varies its load resistance according to the tag information after the tag unit is driven.

In step 470, when the change of the load resistance of the tag unit is detected, according to the change of the load resistance to generate a TX enable signal. When the TX enable signal is generated, the phase of the phase-locked clock and the second carrier are locked, the phase-locked clock is selected to serve as the driving clock for the tag unit, and the response signal is generated.

In step 480, an amplifier is utilized to amplify the response signal, and the amplified response signal is transmitted to the reader. As a result, the phases of the first and second carrier are inverse, and the response signal can be used to cancel the amplitude of the first carrier on the reader, and through the canceled first carrier, the reader can accordingly receive the tag information of the active electronic tag.

In this embodiment, step 430 of selecting one of the delayed clocks as the phase-locked clock includes the following steps. An oscillator frequency is generated, and then the internal clock having the same frequency as the first carrier is generated by dividing the oscillator frequency. The internal clock is delayed so as to generate a plurality of delayed clocks having different phase to each other. One of the delayed clocks is selected and phase compared with the first carrier, and an up count signal or a down count signal is generated according to the result of the phase comparison. The up and down count signal is used to adjusting the phase locked count, and the phase locked count is used to accordingly select one of the delayed clocks as the phase-locked clock to be phase compared with the first carrier and again generate the up or down count signal. The operations of selecting and comparing continue until the TX enable signal is generated.

For example, when the active electronic tag generates 16 delayed clocks, that is, the first delayed clock is delayed by 22.5°, and the second delay clock is delayed by 45°. If the phase locked count is 1 at this moment, the first delayed clock is selected as the phase-locked clock to be compared with the first carrier, if the first delayed clock is phase leading to the first carrier, an up count signal is generated and the phase locked count will be 1+1=2, or if the first carrier is phase leading to the first delayed clock, a down count signal is generated and the phase locked count will be 1−1=0. After that, another delayed clock is selected to be phase compared with the first carrier according to the new phase locked count, and in at most 8 successive comparison, the delayed clock corresponding to the phase locked count is the one of which the phase is the most or second most close to the phase of the first carrier. It is noted that the method above is just an example, and the invention is not limited to this embodiment above.

In this embodiment, step 440 of selecting one of the delayed clocks as the second carrier includes following steps. The offset adjusting parameter is entered for compensating the phase offset occurring during the signal transmission and procession, and making the second carrier in opposite phase with the first carrier. The second carrier count is generated by adding up the offset adjusting parameter and the phase locked count.

For example, when the active electronic tag generates 16 delayed clocks, that is, each delayed clock is delayed by 22.5°. If the summation of all the phase offsets occur during the signal transmission and procession are 45°, then the offset adjusting parameter would be (180°−45°)/22.5°=6, that is, the phase offset resulting by the offset adjusting parameter is 6×22.5°=135°, such that the summation of these two phase offsets is 180°, and the second carrier could be in opposite phase with the first carrier. When the time the active electronic tag transmits with the phase locked count say, is 2, the second carrier count will be 2+6=8, so that the second carrier is the eighth delayed clock and will in opposite phase with the first carrier on the antenna of the reader. It is noted that the method described above is just an example for explanation, and the invention is not limited to this embodiment above.

In this embodiment, step 470 of generating the TX enable signal and response signal, locking the phase-locked clock and the second carrier, and selecting the phase-locked clock as the driving clock for the tag unit includes the following steps. When the TX enable signal is generated, the phase locked count is stopped from being adjusted, and the phase-locked clock and the second carrier is locked. When the phase-locked clock and the second carrier stop altering, the phase-locked clock is selected to serve as the driving clock for the tag unit according to the TX enable signal, and the response signal is generated by inputting the second carrier and the TX enable signal to an AND gate. Because the TX enable signal is generated by detecting the change of the load resistance of the tag unit, and the load resistance is varied according to the tag information, so that the response signal contain the tag information of the tag unit.

In this embodiment, the phase difference between the first carrier and the second carrier is from 158.34 to 201.66 degrees. The reason of this range of the phase difference is described before, and will not be repeated herein.

In view of foregoing, the embodiments of the presented invention utilizing the response signal in opposite phase with the first carrier on the reader to cancel the amplitude of the first carrier, so as to transmit the tag information. In this manner, even when the antenna of the active electronic tag is miniaturized and/or the transmission distance is lengthened, the information can still be transmitted efficiently, such that the electronic tag can be widely applied to many different fields.

Although the present invention has been described in considerable detail with reference to certain embodiments thereof, other embodiments are possible. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An active electronic tag, comprising:
   an antenna for receiving a detecting signal transmitted from a reader, wherein the detecting signal is carried by a first carrier;
   a first amplifier connected to the antenna, for amplifying the detecting signal;
   an automatic gain control circuit connected to the first amplifier, for stabilizing the amplified detecting signal in a feedback loop;
   a phase synchronization locking circuit connected to the first amplifier, for receiving the amplified detecting signal and a TX enable signal, and generating a second carrier and a phase-locked clock;
   a control unit connected to the first amplifier and the phase synchronization locking circuit, for receiving the amplified detecting signal, the second carrier and the phase-locked clock, and detecting a change of a load resistance, wherein when the change of the load resistance is detected, the control unit generates the TX enable signal and a response signal, and the response signal is carried by the second carrier;
   a tag unit connected to the control unit, for storing tag information, wherein the control unit transmits the detecting signal to the tag unit and selects either the first carrier or the phase-locked clock as a driving clock for the tag unit, and the tag unit varies its load resistance according to the tag information, and the control unit switches the driving clock for the tag unit according to the change of the load resistance; and
   a second amplifier connected to the control unit and the antenna, for amplifying and outputting the response signal to the antenna, wherein the antenna transmits the amplified response signal to the reader, and the response signal utilizes a phase difference between the first carrier and the second carrier to cancel the amplitude of the first carrier on the reader, so as to transmit the tag information.

2. The active electronic tag of claim 1, wherein the phase difference between the first carrier and the second carrier is from 158.34 to 201.66 degrees.

3. The active electronic tag of claim 1, wherein the control unit comprises:
   a detector for detecting the change of the load resistance, and generating the TX enable signal according to the change of the load resistance;
   a switching unit for selecting the phase-locked clock as the driving clock to drive the tag unit when the switching unit receives the TX enable signal and for switching the driving clock back to the first carrier when the TX enable signal is stopped; and
   an AND gate for receiving the second carrier and the TX enable signal, and generating the response signal amplified and outputted by the second amplifier.

4. The active electronic tag of claim 1, wherein the phase synchronization locking circuit comprises:
   an oscillator for generating an oscillator frequency;
   a frequency divider for dividing the oscillator frequency to generate an internal clock;
   a delay circuit for delaying the internal clock to generate a plurality of delayed clocks, wherein phases of all of the plurality of delayed clocks are different, and frequencies of all of the plurality of delayed clocks are the same as that of the internal clock;
   a phase selecting unit having a phase locked count, for selecting and outputting one of the plurality of delayed clocks which is the most or second most close to the phase of the first carrier as the phase-locked clock; and
   an offset adjusting unit for selecting the second carrier from the plurality of delayed clocks based on both of the phase locked count and an offset adjusting parameter, wherein the offset adjusting parameter is utilized to adjust a phase of the second carrier, such that the response signal carried by the second carrier cancels the amplitude of the first carrier on the reader.

5. The active electronic tag of claim 4, wherein the phase selecting unit comprises:
   an up/down counter for adjusting the phase locked count according to an up count signal or a down count signal, wherein the up/down counter stops adjusting the phase locked count when receiving the TX enable signal;
   a first phase selector for selecting one of the plurality of delayed clocks as the phase-locked clock based on the phase locked count; and
   a phase comparator for comparing the first carrier with the phase-locked clock and accordingly generating the up count signal or the down count signal based on a result of the comparison.

6. The active electronic tag of claim 4, wherein the offset adjusting unit comprises:
   an adder comprising an input port for inputting the offset adjusting parameter, wherein the adder is used for adding up the phase locked count and the offset adjusting parameter to generate a second carrier count; and a second phase selector for selecting one of the plurality of delayed clocks as the second carrier based on the second carrier count.

7. A signal modulation method for an active electronic tag, the signal modulation method comprising:
   receiving by an antenna a detecting signal transmitted from a reader, wherein the detecting signal is carried by a first carrier;
   amplifying the detecting signal by a first amplifier connected to the antenna and stabilizing by an automatic gain control circuit connected to the first amplifier the amplified detecting signal in a feedback loop;
   receiving the amplified detecting signal and a TX enable signal by a phase synchronization locking circuit connected to the first amplifier;
   generating by the phase synchronization locking circuit a second carrier and a phase-locked clock;
   receiving by a control unit connected to the first amplifier and the phase synchronization locking circuit the amplified detecting signal, the second carrier and the phase-locked clock;
   detecting by the control unit a change of a load resistance, wherein when the change of the load resistance is detected, the control unit generates the TX enable signal and a response signal, and the response signal is carried by the second carrier;
   transmitting by the control unit the detecting signal to a tag unit connected to the control unit for storing tag information and selecting by the control unit either the first carrier or the phase-locked clock as a driving clock for the tag unit, wherein the tag unit varies its load resistance according to the tag information, and wherein the control unit switches the driving clock for the tag unit according to the change of the load resistance;
   amplifying by a second amplifier connected to the control unit and the antenna the response signal;
   outputting by the second amplifier the response signal to the antenna; and
   transmitting the amplified response signal to the reader, wherein the response signal utilizes a phase difference between the first carrier and the second carrier to cancel the amplitude of the first carrier on the reader, so as to transmit the tag information.

8. The signal modulation method of claim 7, wherein the phase difference between the first carrier and the second carrier is from 158.34 to 201.66 degrees.

9. The signal modulation method of claim 7, wherein the step of generating the TX enable signal and the response signal comprises:
   detecting by a detector the change of the load resistance, and generating the TX enable signal according to the change of the load resistance;
   selecting by a switching unit the phase-locked clock as the driving clock to drive the tag unit when the TX enable signal is received by the switching unit, and switching the driving clock back to the first carrier when the TX enable signal is stopped; and
   inputting the second carrier and the TX enable signal to an AND gate to generate the response signal amplified and outputted by the second amplifier.

10. The signal modulation method of claim 7, wherein the step of generating the second carrier and the phase-locked clock comprises:
    generating by an oscillator an oscillator frequency;
    dividing by a frequency divider the oscillator frequency to generate an internal clock;
    delaying by a delay circuit the internal clock to generate a plurality of delayed clocks, wherein phases of all of the plurality of delayed clocks are different, and frequencies of all of the plurality of delayed clocks are the same as that of the internal clock;
    selecting and outputting by a phase selecting unit having a phase locked count one of the plurality of delayed clocks which is the most or second most close to the phase of the first carrier as the phase-locked clock; and
    selecting by an offset adjusting unit one of the plurality of delayed clocks as the second carrier based on both of the phase locked count and an offset adjusting parameter, wherein the offset adjusting parameter is utilized to adjust a phase of the second carrier, such that the response signal carried by the second carrier cancels the amplitude of the first carrier on the reader.

11. The signal modulation method of claim 10, wherein the step of selecting the phase-locked clock from the plurality of delayed clocks comprises:
    adjusting the phase locked count by an up/down counter according to an up count signal or a down count signal, and stopping adjusting the phase locked count when the TX enable signal is received;
    selecting by a first phase selector one of the plurality of delayed clocks as the phase-locked clock based on the phase locked count; and
    phase comparing by a phase comparator the first carrier with the phase-locked clock, and accordingly generating the up count signal or the down count signal based on a result of the comparison.

12. The signal modulation method of claim 10, wherein the step of selecting the second carrier from the plurality of delayed clocks comprises:
    inputting through an input port of an adder the offset adjusting parameter;
    adding up by the adder the phase locked count and the offset adjusting parameter to generate a second carrier count; and
    selecting by a second phase selector one of the plurality of delayed clocks as the second carrier based on the second carrier count.

* * * * *